US009519381B2

(12) United States Patent
Ku et al.

(10) Patent No.: US 9,519,381 B2
(45) Date of Patent: Dec. 13, 2016

(54) ELECTROSTATIC CAPACITY TYPE TOUCH SCREEN PANEL

(75) Inventors: Sunju Ku, Paju-si (KR); Heunglyul Cho, Goyang-si (KR); Kiseung Kim, Paju-si (KR); Heeyoung Kwack, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 225 days.

(21) Appl. No.: 13/312,532

(22) Filed: Dec. 6, 2011

(65) Prior Publication Data

US 2012/0139871 A1    Jun. 7, 2012

(30) Foreign Application Priority Data

Dec. 6, 2010 (KR) .................. 10-2010-0123344
Dec. 6, 2010 (KR) .................. 10-2010-0123350

(51) Int. Cl.
*G06F 3/044* (2006.01)
*G06F 3/045* (2006.01)
*G06F 3/046* (2006.01)

(52) U.S. Cl.
CPC .................................. *G06F 3/044* (2013.01)

(58) Field of Classification Search
None
See application file for complete search history.

(56) References Cited

U.S. PATENT DOCUMENTS

| 8,345,020 B2 | 1/2013 | Jeong et al. | |
| 2002/0130358 A1* | 9/2002 | Van Dalen | H01L 29/405 257/328 |
| 2004/0080262 A1* | 4/2004 | Park | H01L 27/3253 313/498 |
| 2008/0238303 A1* | 10/2008 | Lee | H01L 51/5237 313/504 |
| 2010/0045613 A1* | 2/2010 | Wu et al. | 345/173 |
| 2010/0123674 A1* | 5/2010 | Wu et al. | 345/173 |
| 2010/0171718 A1* | 7/2010 | Denda | G06F 3/044 345/173 |

(Continued)

FOREIGN PATENT DOCUMENTS

| KR | 10-2009-0107337 A | 10/2009 |
| KR | 10-2009-0122586 A | 12/2009 |

(Continued)

*Primary Examiner* — Jason Olson
*Assistant Examiner* — Parul Gupta
(74) *Attorney, Agent, or Firm* — Birch, Stewart, Kolasch & Birch, LLP

(57) ABSTRACT

A touch screen panel for display apparatus is provided, which includes a substrate; an electrode forming part including a plurality of first electrode serials and a plurality of second electrode serials arranged to cross over the plurality of first electrode serials; a routing wire forming part including a plurality of first routing wires connected to the plurality of first electrode serials, respectively and a plurality of second routing wires connected to the plurality of second electrode serials, respectively; a plurality of first insulation patterns formed at a cross region of the first and second electrode serials to insulate the first electrode serial from the second electrode serial; and at least one buffer pattern to be positioned at least one side of each of the first insulation patterns, and be spaced at a predetermined distance from the first insulation pattern.

16 Claims, 12 Drawing Sheets

(56) References Cited

U.S. PATENT DOCUMENTS

| 2011/0193793 | A1* | 8/2011 | An et al. | 345/173 |
| 2011/0233796 | A1* | 9/2011 | Kim et al. | 257/786 |
| 2011/0242018 | A1* | 10/2011 | Kang et al. | 345/173 |
| 2014/0042398 | A1* | 2/2014 | Choi | H01L 27/3244 257/40 |
| 2014/0124352 | A1* | 5/2014 | Lee | H03K 17/962 200/600 |

FOREIGN PATENT DOCUMENTS

| KR | 10-2010-0084261 A | 7/2010 |
| TW | 201009659 A | 3/2010 |
| TW | 201019196 A | 5/2010 |

* cited by examiner

ELECTROSTATIC CAPACITY TYPE TOUCH SCREEN PANEL

This application claims the benefit of Korean Patent Application Nos. 10-2010-0123344 and 10-2010-0123350 both filed on Dec. 6, 2010. The entire contents of each of these applications are incorporated herein by reference for all purposes as if fully set forth herein.

BACKGROUND

Field

The embodiments of this disclosure are directed to an electrostatic capacity type touch screen panel.

Related Art

Display apparatuses, such as liquid crystal displays (LCDs), field emission displays (FEDs), plasma display panel (PDP) displays, and electroluminescent (EL) displays, attract attention due to high response speed, low power consumption, and high color reproduction ratio. Such display apparatuses are used for various electronics including TVs, computer monitors, laptop computers, mobile phones, displays for refrigerators, personal digital assistants, automated teller machines. In general, these display apparatuses constitute an interface with users using various input devices, such as a keyboard, mouse, digitizers, or more. However, the keyboard or mouse is disadvantageous in that a user needs to learn how to use and it occupies a space. In response to increased demand for simple and less malfunctioned input devices, touch screen panels have been suggested that allow a user to directly input information with his/her hand or pen.

Because the touch screen panel has a simple configuration, which minimizes erroneous operations, the user can perform an input action without using a separate input device, and can quickly and easily manipulate through contents displayed on a screen. Accordingly, the touch screen panel has been applied to various display devices.

Touch screen panels are classified into a resistive type, an electrostatic capacitive type, an electromagnetic type according to a detection method of a touched portion. The resistive type touch screen panel determines a touched position by a voltage gradient according to a change of resistance in a state that a DC voltage is applied to metal electrodes formed on an upper plate or a lower plate. The electrostatic capacitive type touch screen panel senses a touched position according to a difference in capacitance created in an upper or lower plate when the user physically contacts with a conductive film formed on the upper or lower plate. The electromagnetic type touch screen panel detects a touched portion by reading an LC value induced as an electromagnetic pen touches a conductive film.

Hereinafter, a related art electrostatic capacitive type touch screen panel will be described with reference to FIGS. 1 to 2B. FIG. 1 is a top plan view illustrating a related art electrostatic capacitive type touch screen panel, FIG. 2A is a cross-sectional view illustrating the touch screen panel taken along line I-I' of FIG. 1, and FIG. 2B is a cross-sectional view illustrating the touch screen panel taken along line II-II' of FIG. 1.

Referring to FIGS. 1, 2A and 2B, the related art electrostatic capacitive type touch screen panel includes an electrode forming part A, a routing wire forming part B, a pad forming part C formed on a substrate 10.

The electrode forming part A is formed on a substrate 10 and includes a plurality of first electrode patterns 40 arranged in parallel in a first direction (for example, X-axis direction), a plurality of bridges 20 connecting the neighboring first electrode patterns 40 each other, and a plurality of second electrode patterns 50 arranged in a second direction (for example, Y-axis direction) to cross over the first electrode patterns 40.

The routing wire forming part B is formed on the substrate 10 at positions outside the electrode forming part A and includes a plurality of first routing wires 61 connected to the plurality of first electrode patterns 40, respectively, and a plurality of second routing wires 63 connected to the plurality of second electrode patterns 50, respectively.

The pad forming part C includes a plurality of first pads 71 connected to the plurality of first electrode patterns 40 through the plurality of first routing wires 61, respectively, and a plurality of second pads 73 connected to the plurality of second electrodes 50 through the plurality of second routing wires 63, respectively.

The electrostatic capacitive type touch screen panel also includes an insulation layer 30. The insulation layer 30 is formed on the substrate 10 on which the bridges 20 and the first and second routing wires 61 and 63 are formed, and electrically insulate the first electrode patterns 40 from the second electrode patterns 50. The insulation layer 30 includes first contact holes 33 exposing the bridges 20 and second contact holes 35 exposing the first and second routing wires 61 and 63.

In order to assemble the related art touch screen panel to a display panel, it is necessary for a module process to attach a polarizing sheet, a print circuit board, a backlight unit and so on to the display panel. In the first step of the module process, an abrasive belt for removing a pollution material on the display panel is used. However there are scratches on surface of electrode patterns of the touch screen panel by the abrasive belt.

FIG. 3A is a conceptual view schematically illustrating a module-cleaning process of the display panel having the touch screen panel, and FIG. 3B is a SEM (Scanning Electron Microscope) photograph taking a picture of "R" portion of FIG. 3A.

Referring FIG. 3A, for the module-cleaning process, the display panel DP having the touch screen panel TSP is moved along an arrow direction "a" by the carrier roller T. Abrasive belts AB are disposed on an upper side of the touch screen panel TSP and on a lower side of the display panel DP, respectively. The abrasive belts are rotated along arrow directions "b". Accordingly, the pollution materials on the surfaces of the touch screen panel TSP and the display panel DP are removed by abrasion between the abrasive belts AB and the surfaces.

However, the second electrode pattern 50 of the touch screen panel TSP has a "R" portion (hereinafter, it is also referred to as "a step coverage") which is protruded upward because the bridge 20 is formed on the substrate 10 and the bridge 20 is covered with the insulation layer 30 as shown in FIG. 3A. There may be a scratch on the "R" portion of the second electrode pattern 50 when the display panel DP having the touch screen panel TSP is moved along the arrow direction "a" and the abrasive belts AB are rotated along the arrow direction "b" because the "R" portion is protruded upward from other portions.

FIG. 3B is a SEM (Scanning Electron Microscope) photograph taking a picture of "R" portion of FIG. 3A, and shows a state that the second electrode pattern 50 is opened by the scratch of the "R" portion.

If the second electrode pattern 50 of the touch screen panel TSP is opened, it is impossible to perceive a touch operation when the touch screen panel is touched with a finger, a pen and so on.

SUMMARY

Exemplary embodiments of this disclosure provide an electrostatic capacitive type touch screen panel, which can prevent the step coverage (the "R" portion) of the second electrode pattern from being opened by the abrasive belts in the module-cleaning process.

Additional features and advantages of this disclosure will be set forth in the description which follows, and in part will be apparent from the description, or may be learned by practice of this disclosure. The objectives and other advantages of this disclosure will be realized and attained by the structure particularly pointed out in the written description and claims hereof as well as the appended drawings.

According to an embodiment, there is provided an electrostatic capacitive type touch screen panel comprising a substrate; an electrode forming part including a plurality of first electrode serials arranged in parallel in a first direction and a plurality of second electrode serials arranged in parallel in a second direction to cross over the plurality of first electrode serials; a routing wire forming part formed on the substrate outside the electrode forming part, and including a plurality of first routing wires connected to the plurality of first electrode serials, respectively and a plurality of second routing wires connected to the plurality of second electrode serials, respectively; a plurality of first insulation patterns formed at a cross region of the first and second electrode serials to insulate the first electrode serial from the second electrode serial; and at least one buffer pattern to be positioned at least one side of each of the first insulation patterns, and be spaced at a predetermined distance from the first insulation pattern.

The buffer pattern is formed to be overlapped with a portion of the second electrode serial.

Each of the first electrode serials includes a plurality of first electrode patterns, and a plurality of first connection patterns connecting the neighboring fist electrode patterns to each other.

A height of the buffer pattern is equal to or larger than a total height adding a height of the first connection pattern to a height of the first insulation pattern.

The buffer patterns are positioned at both sides of the first insulation pattern.

A width of a side wall of the buffer pattern near to the first insulation pattern is equal to or smaller than a width of side wall of the buffer pattern far from the first insulation pattern.

According to another embodiment, there is provided an electrostatic capacitive type touch screen panel comprising a substrate; an electrode forming part including a plurality of first electrode serials arranged in parallel in a first direction and a plurality of second electrode serials arranged in parallel in a second direction to cross over the plurality of first electrode serials; a routing wire forming part formed on the substrate outside the electrode forming part, and including a plurality of first routing wires connected to the plurality of first electrode serials, respectively and a plurality of second routing wires connected to the plurality of second electrode serials, respectively; a plurality of first insulation patterns formed at a cross region of the first and second electrode serials to insulate the first electrode serial from the second electrode serial, wherein the buffer pattern has at least one flat portion and at least one protrusion portion protruded upward from the at least one flat portion.

Each of the first electrode serials includes a plurality of first electrode patterns, and a plurality of first connection patterns connecting the neighboring fist electrode patterns to each other.

The at least one flat portion and the at least one protrusion portion are formed at areas where the first insulation patterns are overlapped with the second electrode serials.

The second electrode serial includes at least one flat portion corresponding to the first flat portion and at least one protrusion portion corresponding to the first protrusion portion.

A width of the first flat portion is larger than that of the first protrusion portion.

The first flat portion and the first protrusion portion are alternately formed.

The first flat portion and the first protrusion portion include an overlap portion overlapped with the first connection pattern and a non-overlap portion which is not overlapped with the first connection pattern.

BRIEF DESCRIPTION OF THE DRAWINGS

The accompanying drawings, which are included to provide a further understanding of the embodiments and are incorporated in and constitute a part of this specification, illustrate embodiments of this disclosure and together with the description serve to explain the principles of the embodiments of this disclosure. In the drawings.

DETAILED DESCRIPTION OF THE EMBODIMENTS

Figure 1:
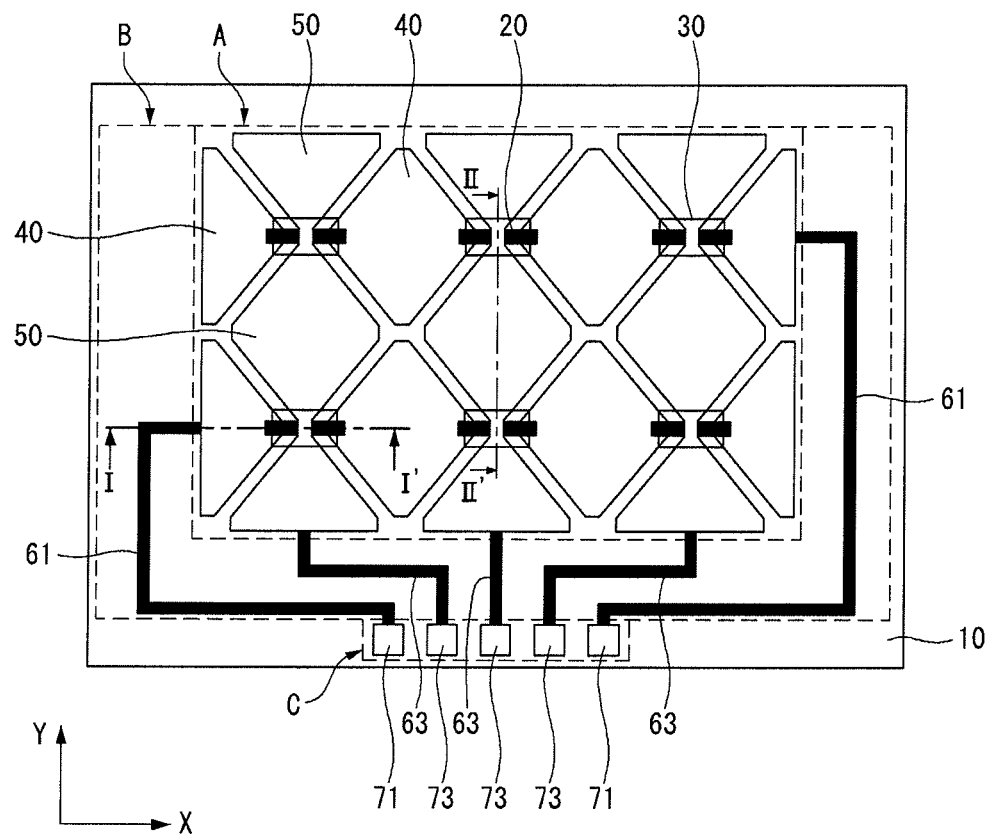
FIG. 1 is a plan view illustrating a related art electrostatic capacitive type touch screen panel.
Figure 2A:
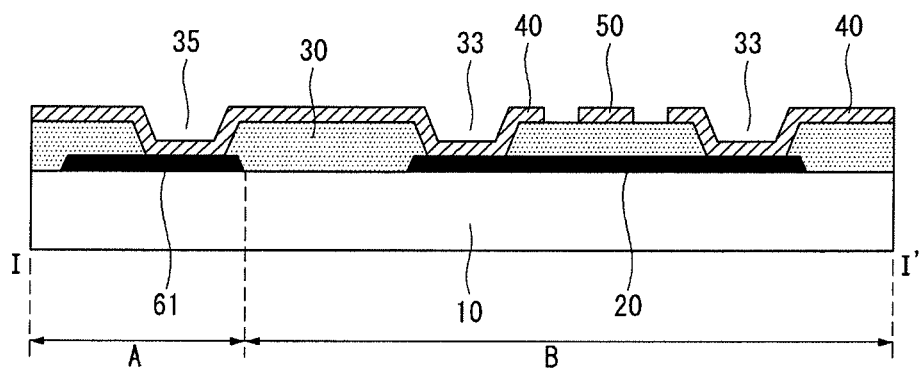
FIG. 2A is a cross-sectional view illustrating the touch screen panel taken along line I-I' of FIG. 1.
Figure 2B:
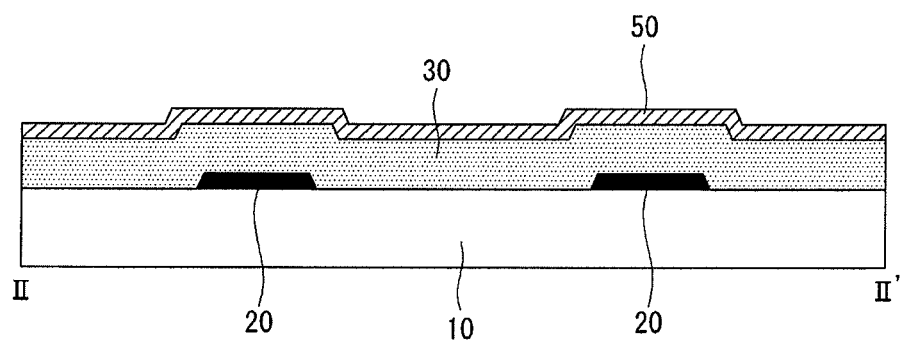
FIG. 2B is a cross-sectional view illustrating the touch screen panel taken along line II-II' of FIG. 1.
Figure 3A:
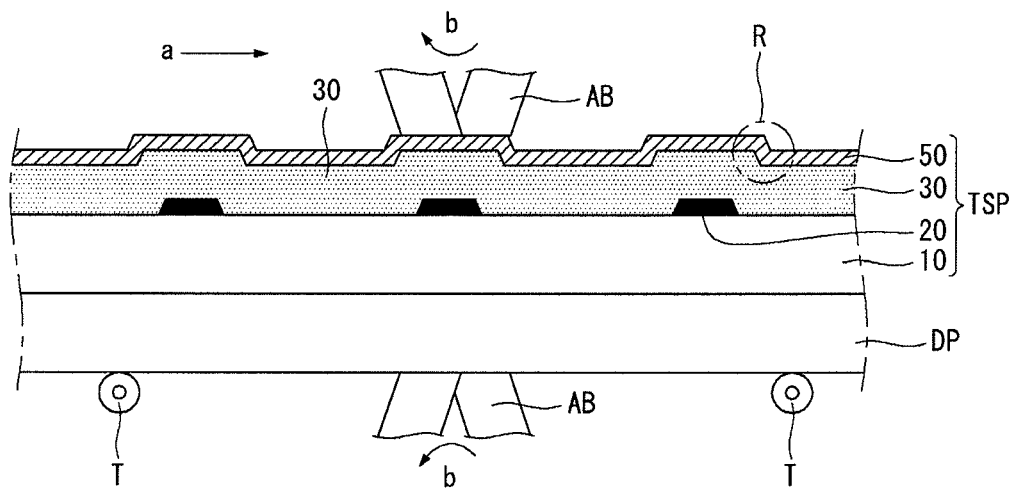
FIG. 3A is a conceptual view schematically illustrating a module-cleaning process of the display panel having the touch screen panel.
Figure 3B:
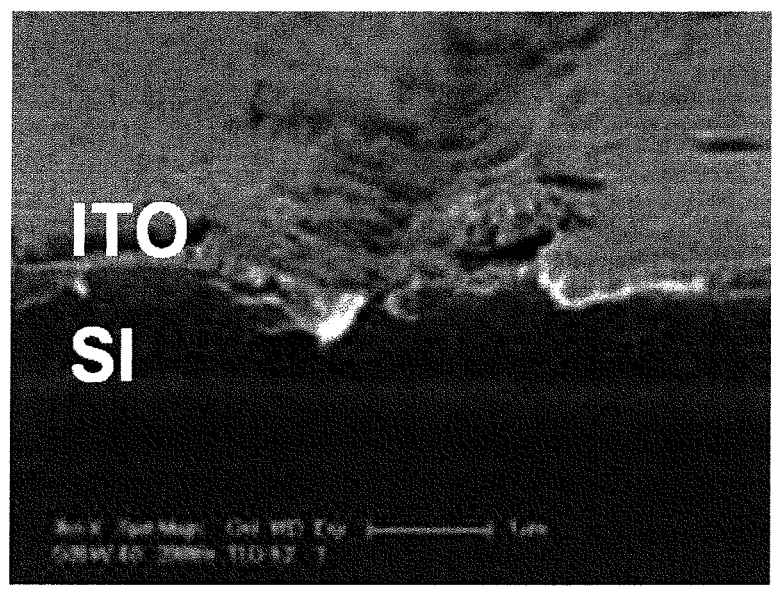
FIG. 3B is a SEM (Scanning Electron Microscope) photograph taking a picture of "R" portion of FIG. 3A.

Hereinafter, embodiments of this disclosure will be described in greater detail with reference to the accompanying drawings, wherein the same reference numerals may be used to denote the same or substantially the same elements throughout the specification and the drawings.

Figure 4:
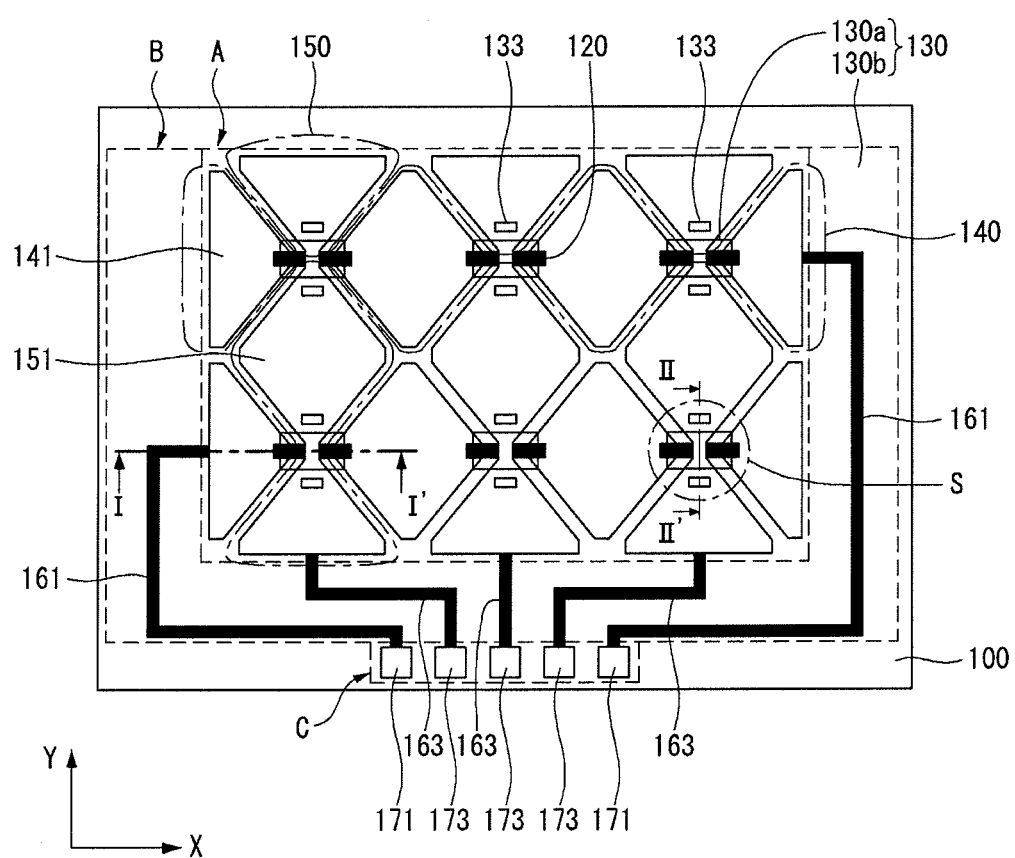
FIG. 4 is a plan view illustrating an electrostatic capacitive type touch screen panel according to a first embodiment of this disclosure.
Figure 5A:
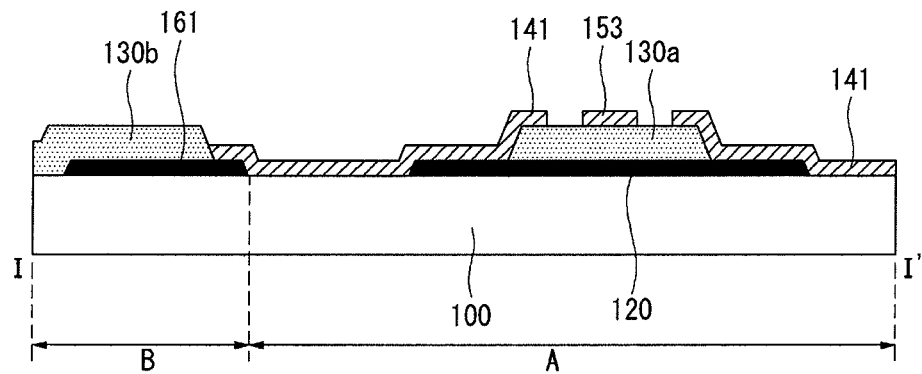
FIG. 5A is a cross-sectional view illustrating the touch screen panel taken along line I-I' of FIG. 4.

First of all, an electrostatic capacitive type touch screen panel according to a first embodiment of this disclosure is described with reference to FIGS. 4 to 5C. FIG. 4 is a plan view illustrating an electrostatic capacitive type touch screen panel according to a first embodiment of this disclosure, FIG. 5A is a cross-sectional view illustrating the touch screen panel taken along line I-I' of FIG. 4, FIG. 5B is a cross-sectional view illustrating the touch screen panel taken along line II-II' of FIG. 4, and FIG. 5C is a cross-sectional view illustrating another example of the touch screen panel taken along line II-II' of FIG. 4.

Figure 5B:
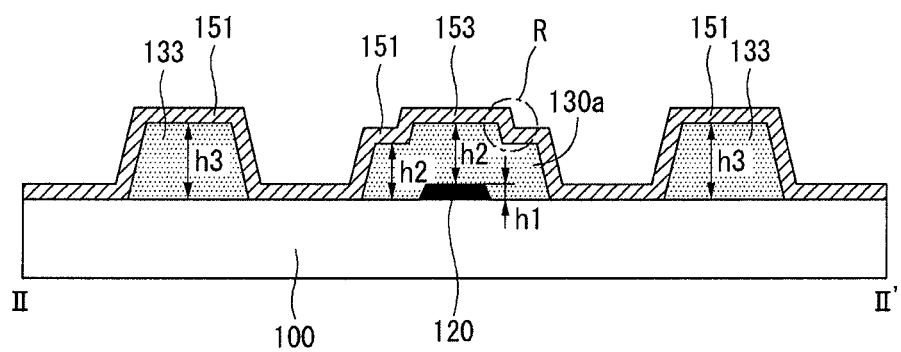
FIG. 5B is a cross-sectional view illustrating the touch screen panel taken along line II-II' of FIG. 4.
Figure 5C:
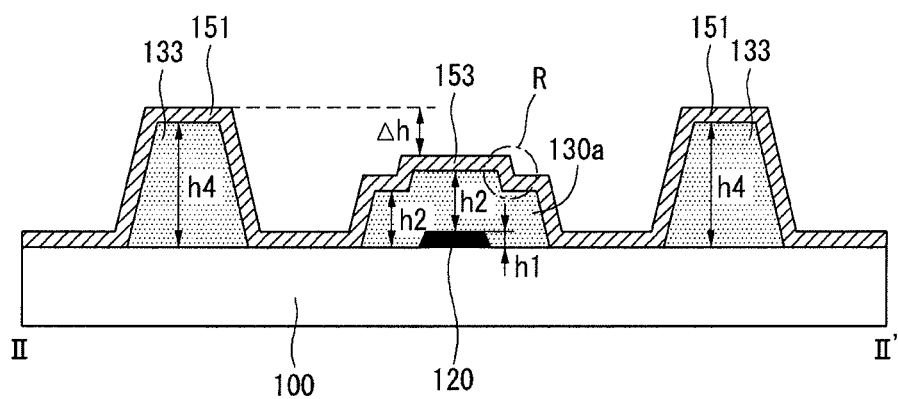
FIG. 5C is a cross-sectional view illustrating another example of the touch screen panel taken along line II-II' of FIG. 4.

Referring to FIGS. 4 to 5B, the electrostatic capacitive type touch screen panel according to the first embodiment of this disclosure includes an electrode forming part A, a routing wire forming part B, a pad forming part C formed on a substrate 100.

The electrode forming part A is formed on a substrate 100 and includes a plurality of first electrode serials 140 arranged in parallel in a first direction (for example, X-axis direction), and a plurality of second electrode serials 150 arranged in a second direction (for example, Y-axis direction) to cross over the first electrode serials 140.

The electrode forming part A includes also a plurality of first insulation patterns 130a and buffer patterns 133. The first insulation patterns 130a are formed at intersection areas where the first electrode serials 140 is crossed over the second electrode serials 150 to electrically insulate the first electrode serials 140 from second electrode serials 150. The buffer patterns 133 are spaced at a predetermined distance from each of the plurality of first insulation patterns 130 along the second electrode serials 150. Also, the buffer patterns 133 are formed on both sides of each of the first insulation pattern 130a.

Each of the first electrode serials 140 includes a plurality of first electrode patterns 141 and a plurality of first connection patterns 120. Each of the plurality of first electrode patterns 141 has a triangle, a rectangle, a square, a quadrangle, a diamond shape, a polygonal shape, and the like. Any suitable shape of the first electrode pattern 141 may be used. Each of the plurality of first connection patterns 120 connects the neighboring first electrode patterns 141. The plurality of first electrode patterns 141 and the plurality of first connection patterns 120 are formed in independent patterns.

Each of the second electrode serials 150 includes a plurality of second electrode patterns 151 and a plurality of second connection patterns 153. Each of the plurality of second electrode patterns 151 has a triangle, a rectangle, a square, a quadrangle, a diamond shape, a polygonal shape and the like, which may be similar to the first electrode patterns 141. Any suitable shape of the second electrode pattern 151 may be used. Each of the second connection patterns 153 connects the neighboring second electrode patterns 151. The plurality of second electrode patterns 151 and the plurality of second connection patterns 153 are formed integrally.

Each of the first connection patterns 120 is formed between the first insulation patterns 130a and the substrate 100 at a cross region of the first electrode serial 140 and the second electrode serial 150 to connect the neighboring first electrode patterns 141 to each other. On the other hand, each of the second connection patterns 153 is integrally formed with each of the second electrode patterns 151 and formed on the first insulation patterns 130a at a cross region of the first electrode serial 140 and the second electrode serial 150.

In the first embodiment of this disclosure, the first and second electrode patterns 141 and 151, and the second connection pattern 153 are formed of a transparent conductive material such as indium tin oxide (ITO), indium zinc oxide (IZO) and gallium-doped zinc oxide (GZO). The first connection pattern 120 is formed of metal material such as Al, AlNd, Mo, MoTi, Cu, CuOx and Cr. Alternately, the first connection pattern 120 is formed of the transparent conductive material such as ITO, IZO and GZO. The first connection pattern 120 may be formed of multiple layers. If the first connection pattern 120 is formed of multiple layers, a lower layer of the first connection pattern 120 is formed of the metal material such as Al, AlNd, Mo, MoTi, Cu, CuOx and Cr, and an upper layer of the first connection pattern 120 is formed of the transparent conductive material such as ITO, IZO and GZO. The first insulation patterns 130a and the buffer patterns 133 are formed of inorganic material such as SiNx and SiOx. However the first insulation patterns 130a and the buffer patterns 133 may be formed of organic material such as photo-acryl.

The routing wire forming part B is formed on the substrate 100 at positions outside the electrode forming part A, and includes a plurality of first routing wires 161 connected to the plurality of first electrode serials 140, respectively and a plurality of second routing wires 163 connected to the plurality of second electrode serials 150, respectively. The routing wire forming part B also includes a second insulation pattern 130b covering the first and second routing wires 161 and 163.

The first and second routing wires 161 and 163 may be formed of single layer or multiple layers. If the first and second routing wires 161 and 163 are formed of single layer, the first and second routing wires 161 and 163 are formed of the metal material such as Al, AlNd, Mo, MoTi, Cu, CuOx and Cr. If the first and second routing wires 161 and 163 are formed of multiple layers, lower layers of the first and second routing wires 161 and 163 are formed of the metal material such as Al, AlNd, Mo, MoTi, Cu, CuOx and Cr, and upper layers of the first and second routing wires 161 and 163 are formed of the transparent material such as ITO, IZO and GZO. The second insulation pattern 130b is formed of inorganic material such as SiNx and SiOx. However the second insulation pattern 133 may be formed of organic material such as photo-acryl.

The pad forming part C includes a plurality of first pads 171 connected to the plurality of first electrode serials 140 through the plurality of first routing wires 161, respectively, and a plurality of second pads 173 connected to the plurality of second electrode serials 150 through the plurality of second routing wires 163, respectively.

Hereinafter, the buffer patterns 133 of the touch screen panels according to the first embodiment of this disclosure will be described in more detailed with reference to FIGS. 5B and 5C.

The buffer patterns 133 are formed to be overlapped with portions of the second electrode patterns 151 in the second electrode serial 150. Also, the buffer patterns 133 are formed to be positioned both sides of each first insulation pattern 130a, and are spaced at a predetermined distance from the first insulation patterns 130a. In this embodiment, it is described that the buffer patterns 133 are formed to be positioned both sides of each first insulation pattern 130a. But this disclosure is not limited thereto. The buffer patterns 133 may be formed to be positioned only one side of each first insulation pattern 130a. However if the buffer patterns 133 are formed to be positioned one side of each first insulation pattern 130a, the portion of the buffer patterns must be arranged directed to a progress direction of a module-cleaning process when the module-cleaning process is performed. Accordingly, it is possible to bring out an inconvenience in the module-cleaning process.

In the embodiment of this disclosure, if a height of the first connection pattern 120 is h1 and a height of the first insulation pattern 130a is h2, it is preferable that a height h3 of the buffer pattern 133 is equal to or higher than h1+h2. FIG. 5B is a cross-sectional view illustrating a case that the height h3 of the buffer pattern 133 is equal to a total height adding the height h1 of the first connection pattern 120 to the height h2 of the first insulation pattern 130a. FIG. 5C is a cross-sectional view illustrating another case that the height h4 of the buffer pattern 133 is higher than a total height adding the height h1 of the first connection pattern 120 to the height h2 of the first insulation pattern 130a.

As thus, if the buffer patterns 133 are formed at least one side of the each first insulation pattern 130a, it is possible to reduce force applied to the "R" portion of the second connection pattern 153 by the abrasive belt in the module-cleaning process because the abrasive belt is contacted with the second electrode pattern 151 of the second electrode serial 150 formed on the buffer pattern 133 before the abrasive belt is contacted with the "R" portion of the second connection pattern 153 of the second electrode serial 150. In particular, if the height h4 of the buffer pattern 133 is higher than a total height adding the height h1 of the first connection pattern 120 to the height h2 of the first insulation pattern 130a, it is possible to more effectively reduce force applied to the "R" portion of the second connection pattern 153 by the abrasive belt in the module-cleaning process, thereby preventing scratches from being formed on the second connection patterns 153 of the second electrode serial 150.

On the other hand, there may be scratches on the second electrode patterns 151 of the second electrode serial 150 by the abrasive belt. However, the buffer patterns 133 are partially overlapped with the second electrode patterns 151 as shown in FIG. 4. Accordingly, although the second electrode patterns 151 are partially damaged, an electrical path between the neighboring second electrode patterns 151 is maintained.

Figure 6:
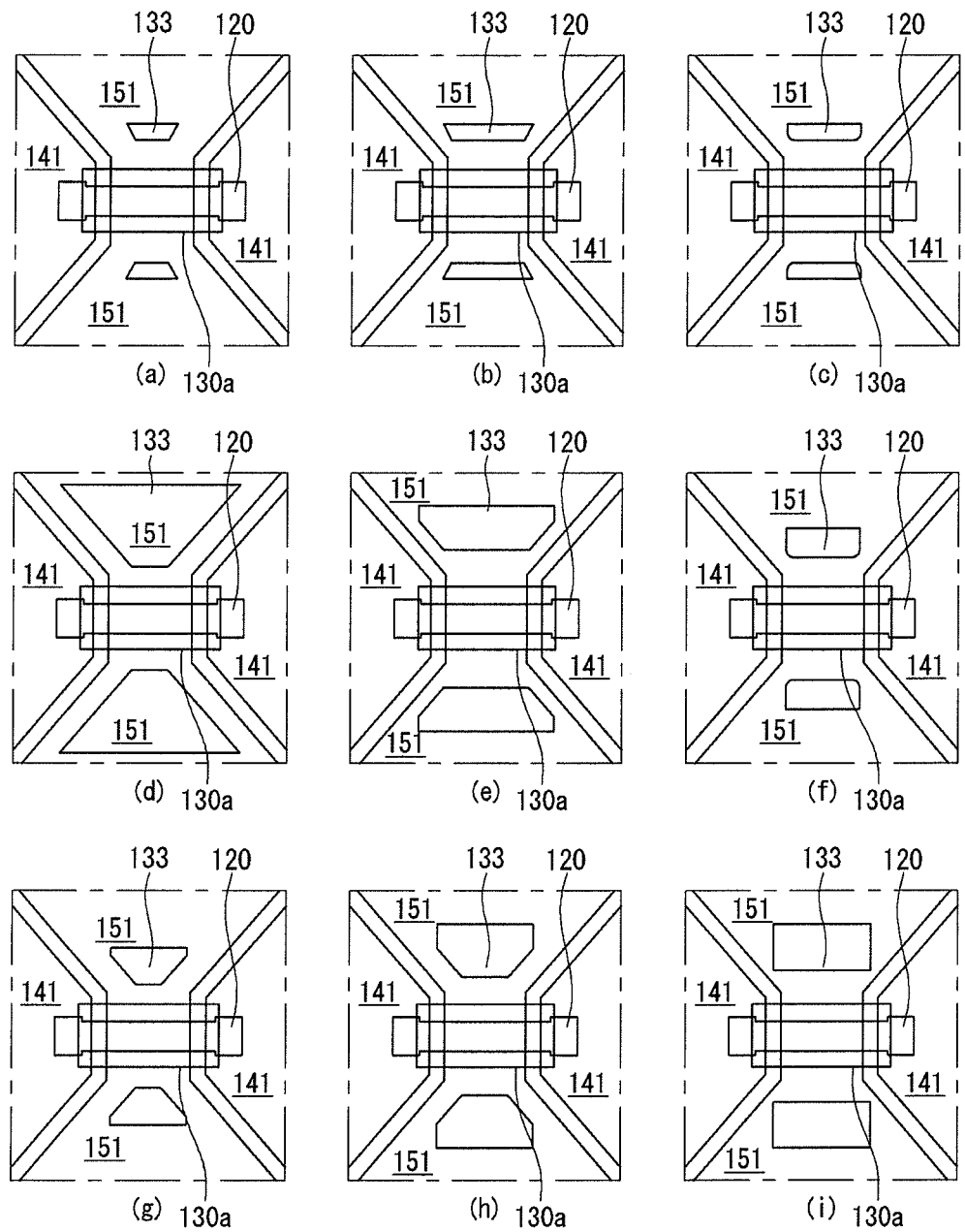
FIG. 6 are plan views illustrating "S" portions of the touch screen panel of FIG. 4, wherein shape of buffer patterns are illustrated variously.
Figure 7:
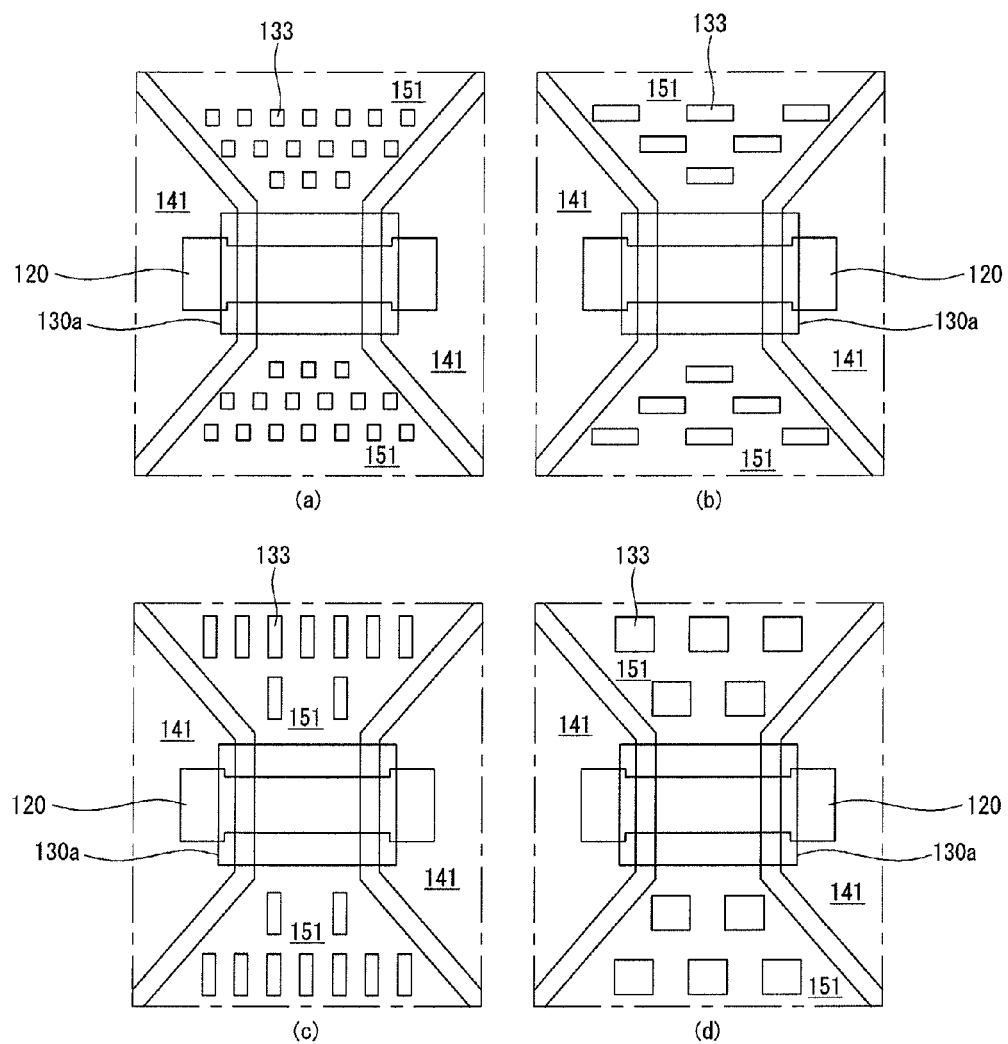
FIG. 7 are plan views illustrating "S" portions of the touch screen panel of FIG. 4, wherein a plurality of buffer patterns are arranged in various.

The buffer patterns 133 are formed of various shapes. FIGS. 6 and 7 show the buffer patterns having various shapes.

FIG. 6 are plan views illustrating "S" portions of the touch screen panel of FIG. 4, wherein shapes of buffer patterns 133 are illustrated variously. FIG. 7 are plan views illustrating "S" portions of the touch screen panel of FIG. 4, wherein a plurality of buffer patterns 133 are arranged in various.

In the buffer patterns 133 shown in (a), (b), (c), (d), (e), (g) and (h) of FIG. 6, a width of side wall near to the first insulation pattern 130a is smaller than a width of side wall far from the first insulation pattern 130a. In the buffer patterns 133 shown in (c), (f) and (i) of FIG. 6, a width of side wall near to the first insulation pattern 130a is similar to a width of side wall far from the first insulation pattern 130a. Any one of the examples of FIG. 6 can reduce force applied to the "R" portion of the second connection pattern 153 by the abrasive belt in the module-cleaning process, thereby preventing scratches from being formed on the second connection patterns 153 of the second electrode serial 150.

The buffer patterns 133 of FIG. 7 are smaller than those of FIG. 6. In examples (a)-(d) of FIG. 7, number of buffer patterns formed in area of one second electrode pattern is larger than that formed in the FIG. 6. Accordingly, it is possible for the examples of FIG. 7 to achieve the effects similar to the examples of the FIG. 6.

Figure 8:
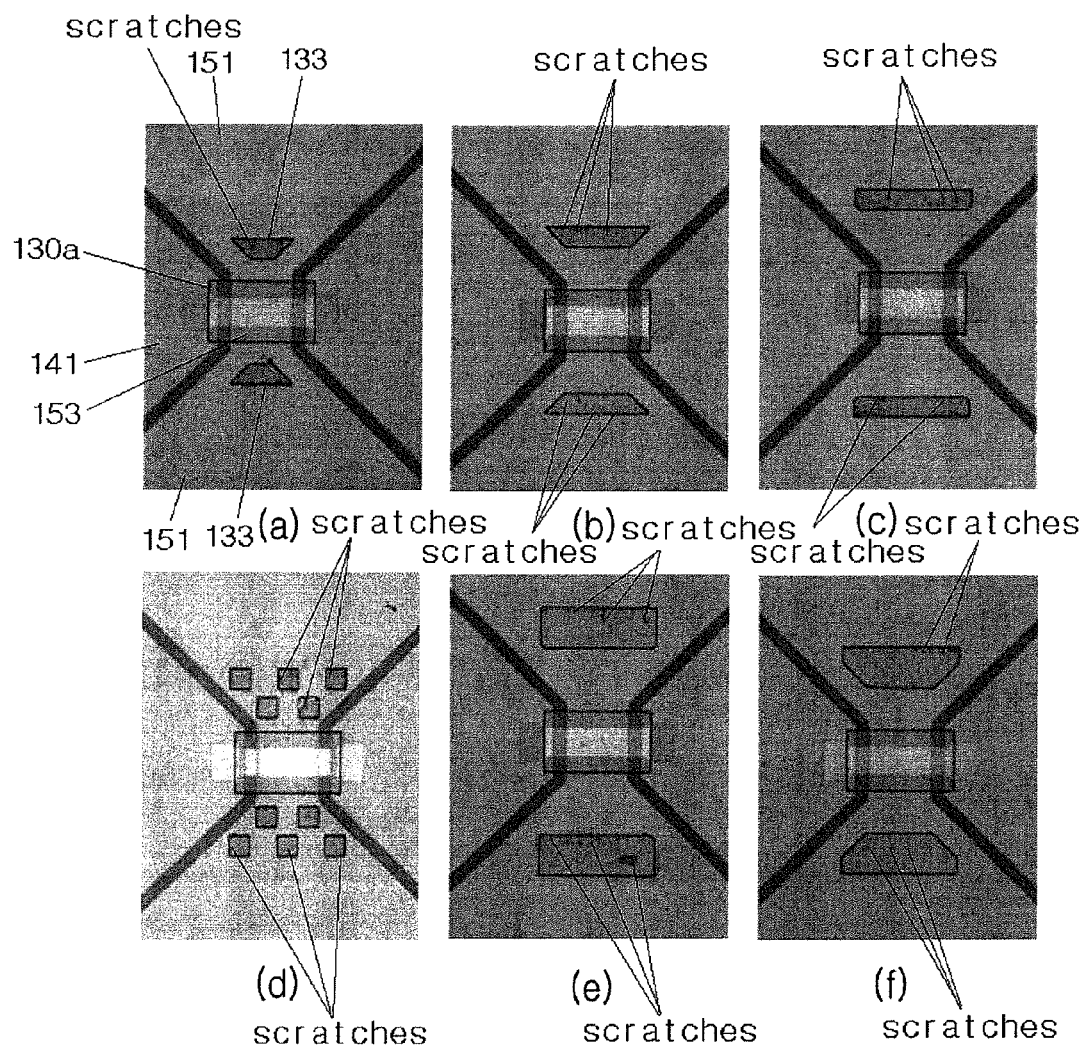
FIG. 8 is a SEM photograph taking a picture of "S" portion of FIG. 4.

FIG. 8 is a SEM photograph taking a picture of "S" portion of FIG. 4 after the module-cleaning process is completed. Each of (a)-(f) of FIG. 8 shows that scratches formed on the second electrode patterns 151 corresponding to the buffer patterns 133 are more than that of the second connection patterns 153 corresponding to the first insulation patterns 130a.

As thus, according to the first embodiment of this disclosure, scratches formed on the second connection patterns of the second electrode serial are reduced because it is possible to reduce force applied to the "R" portion of the second connection pattern by the abrasive belt in the module-cleaning process.

Figure 9:
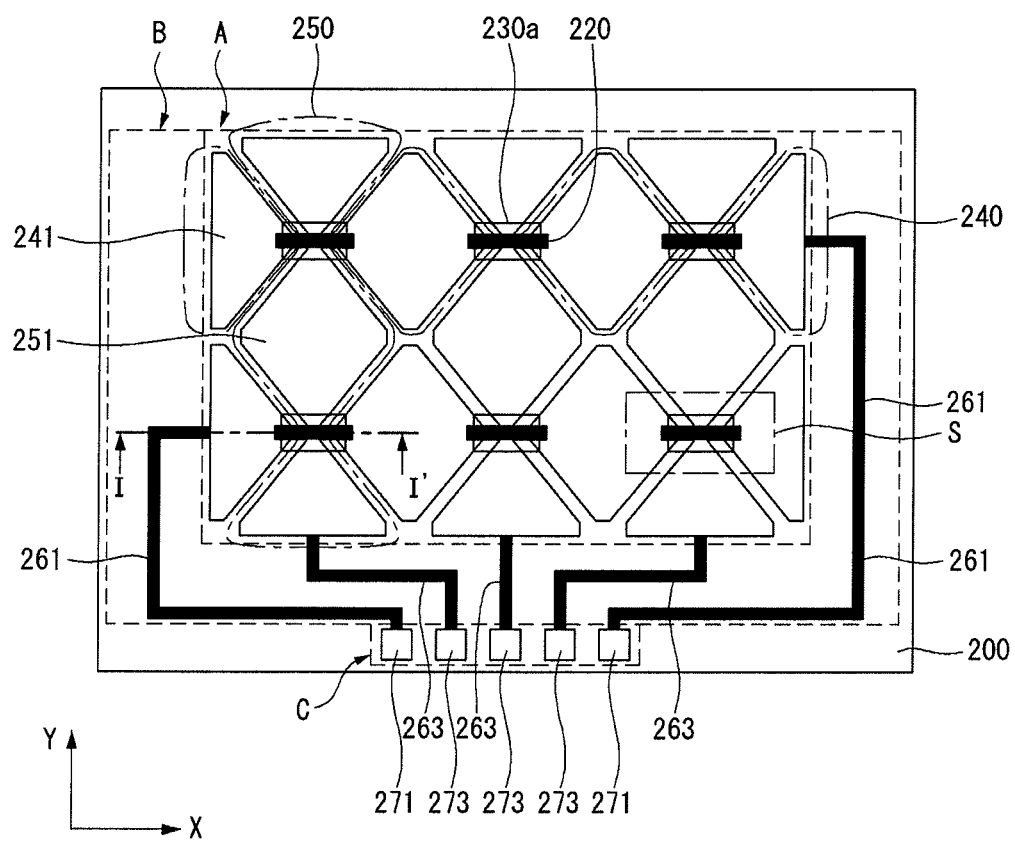
FIG. 9 is a plan view illustrating an electrostatic capacitive type touch screen panel according to a second embodiment of this disclosure.
Figure 10A:
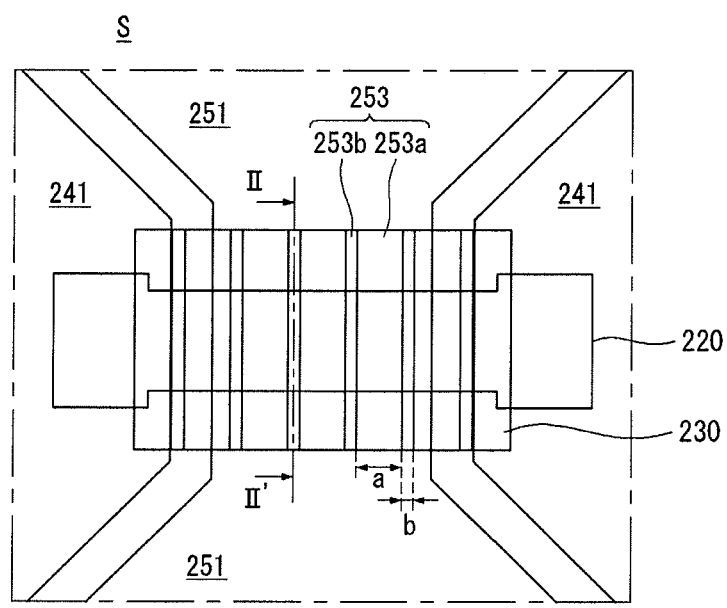
FIG. 10A is an enlarged plan view illustrating "S" portion of FIG. 9.
Figure 10B:
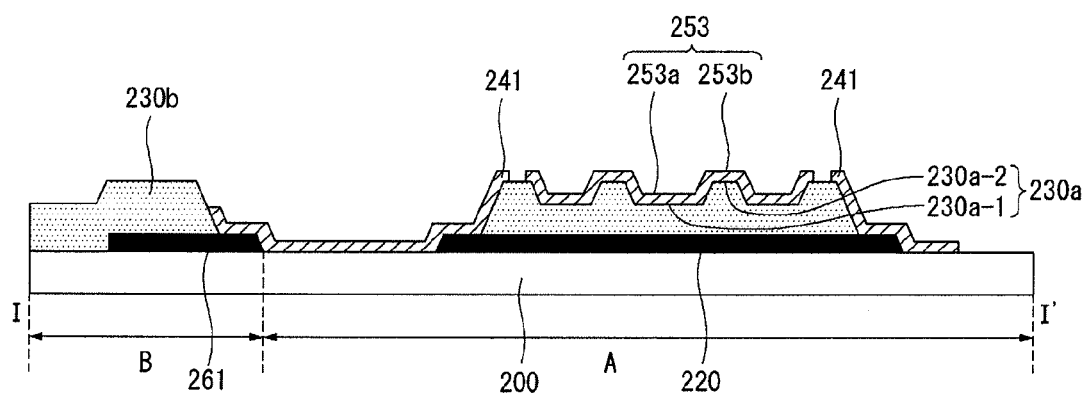
FIG. 10B is a cross-sectional view illustrating the touch screen panel taken along line I-I' of FIG. 9.

Hereinafter, an electrostatic capacitive type touch screen panel according to a second embodiment of this disclosure is described with reference to FIGS. 9 to 10C. FIG. 9 is a plan view illustrating an electrostatic capacitive type touch screen panel according to a second embodiment of this disclosure, FIG. 10A is an enlarged plan view illustrating "S" portion of FIG. 9, FIG. 10B is a cross-sectional view illustrating the touch screen panel taken along line I-I' of FIG. 9, and FIG. 10C is a cross-sectional view illustrating the touch screen panel taken along line II-II' of FIG. 10A.

Figure 10C:
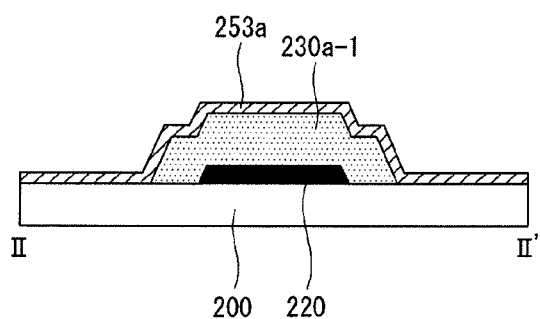
FIG. 10C is a cross-sectional view illustrating the touch screen panel taken along line II-II' of FIG. 10.

Referring to FIGS. 9 to 10C, the electrostatic capacitive type touch screen panel according to the second embodiment of this disclosure includes an electrode forming part A, a routing wire forming part B, a pad forming part C formed on a substrate 200.

The electrode forming part A is formed on a substrate 200 and includes a plurality of first electrode serials 240 arranged in parallel in a first direction (for example, X-axis direction), and a plurality of second electrode serials 250 arranged in a second direction (for example, Y-axis direction) to cross over the first electrode serials 240.

The electrode forming part A includes also a plurality of first insulation patterns 230a. The first insulation patterns 230a are formed at intersection areas where the first electrode serials 240 is crossed over the second electrode serials 250 to electrically insulate the first electrode serials 240 from second electrode serials 250.

Each of the first electrode serials 240 includes a plurality of first electrode patterns 241 and a plurality of first connection patterns 220. Each of the plurality of first electrode patterns 241 has a triangle, a rectangle, a square, a quadrangle, a diamond shape, a polygonal shape, and the like. Any suitable shape of the first electrode pattern 241 may be used. Each of the plurality of first connection patterns 220 connects the neighboring first electrode patterns 241. The plurality of first electrode patterns 241 and the plurality of first connection patterns 220 are formed in independent patterns.

Each of the second electrode serials 250 includes a plurality of second electrode patterns 251 and a plurality of second connection patterns 253. Each of the plurality of second electrode patterns 251 has a triangle, a rectangle, a square, a quadrangle, a diamond shape, a polygonal shape and the like, which may be similar to the first electrode patterns 241. Any suitable shape of the second electrode pattern 251 may be used. Each of the second connection patterns 253 connecting the neighboring second electrode patterns 251. The plurality of second electrode patterns 251 and the plurality of second connection patterns 253 are formed integrally.

Each of the first connection patterns 220 is formed between the first insulation patterns 230a and the substrate 200 at a cross region of the first electrode serial 240 and the second electrode serial 250 to connect the neighboring first electrode patterns 241 to each other. On the other hand, each of the second connection patterns 253 is integrally formed with the second electrode patterns 251 and formed on the first insulation patterns 230a at a cross region of the first electrode serial 240 and the second electrode serial 250.

Each of the first insulation patterns 230a is formed on the substrate 200 to expose both ends of the first connection pattern 220 and to insulate the first electrode serial 240 from the second electrode serial 250 as shown in FIGS. 10A and 10C. The first insulation pattern 230a includes at least one first flat portion 230a-1 and at least one first protrusion portion 230a-2 overlapped with the second connection pattern 253.

A width "a" of the first flat portion 230a-1 of the first insulation pattern 230a is wider than a width "b" of the first protrusion portion 230a-2. If each of the first flat portion and protrusion portion are at least two, the first flat portion 230a-1 and the first protrusion portion 230a-2 of the first insulation pattern 230a are formed alternatively.

The second connection pattern 253 includes also a second flat portion 253a and a second protrusion portion 253b corresponding to the first flat portion 230a-1 and the first protrusion portion 230a-2 of the first insulation pattern 230a respectively.

As thus, because the second connection pattern 253 of the second electrode serial 250 includes a second flat portion 253a and a second protrusion portion 253b corresponding to the first flat portion 230a-1 and the first protrusion portion 230a-2 of the first insulation pattern 230a respectively, the abrasive belt is contacted with the second protrusion portion 253b of the second connection pattern 253 in the module-cleaning process. Accordingly, it is possible to protect the second flat portion 253b of the second connection pattern 253 from the abrasive belt in the module-cleaning process.

In the second embodiment of this disclosure, the first and second electrode patterns 241 and 251, and the second connection pattern 253 are formed of a transparent conductive material such as ITO, IZO and GZO. The first connection pattern 220 is formed of metal material such as Al, AlNd, Mo, MoTi, Cu, CuOx and Cr. Alternately, the first connection pattern 220 is formed of the transparent conductive material such as ITO, IZO and GZO. The first connection pattern 220 may be formed of multiple layers. If the first connection pattern 220 is formed of multiple layers, a lower layer of the first connection pattern 220 is formed of the metal material such as Al, AlNd, Mo, MoTi, Cu, CuOx and Cr, and an upper layer of the first connection pattern 220 is formed of the transparent material such as ITO, IZO and GZO. The first insulation patterns 230a are formed of inorganic material such as SiNx and SiOx. However the first insulation patterns 230a may be formed of organic material such as photo-acryl.

The routing wire forming part B is formed on the substrate 200 at positions outside the electrode forming part A, and includes a plurality of first routing wires 261 connected to the plurality of first electrode serials 240, respectively and a plurality of second routing wires 263 connected to the plurality of second electrode serials 250, respectively. The routing wire forming part B also includes a second insulation pattern 230b covering the first and second routing wires 261 and 263.

The first and second routing wires 261 and 263 may be formed of single layer or multiple layers. If the first and second routing wires 261 and 263 are formed of single layer, the first and second routing wires 261 and 263 are formed of the metal material such as Al, AlNd, Mo, MoTi, Cu, CuOx and Cr. If the first and second routing wires 261 and 263 are formed of multiple layers, lower layers of the first and second routing wires 261 and 263 are formed of the metal material such as Al, AlNd, Mo, MoTi, Cu, CuOx and Cr, and upper layers of the first and second routing wires 261 and 263 are formed of the transparent material such as ITO, IZO and GZO. The second insulation pattern 230b is formed of inorganic material such as SiNx and SiOx. However the second insulation pattern 230b may be formed of organic material such as photo-acryl.

The pad forming part C includes a plurality of first pads 271 connected to the plurality of first electrode serials 240 through the plurality of first routing wires 261, respectively, and a plurality of second pads 273 connected to the plurality of second electrode serials 250 through the plurality of second routing wires 263, respectively.

Figure 11:
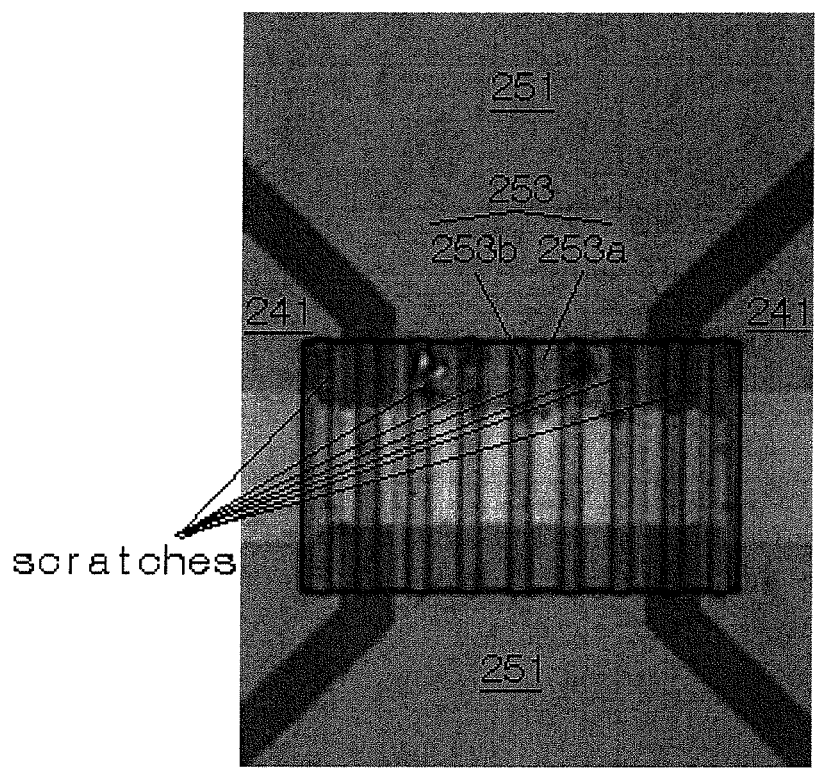
FIG. 11 is a SEM photograph taking a picture of "S" portion of FIG. 9.

FIG. 11 is a SEM photograph taking a picture of "S" portion of FIG. 9 after the module-cleaning process is completed. FIG. 11 shows that scratches are formed on the second protrusion portion 253b of the second connection patterns 253 corresponding to the first protrusion portion 230a-2 of the first insulation pattern 230a.

As thus, according to the second embodiment of this disclosure, the second flat portions 253a of the second connection pattern 253 are protected from the abrasive belt because the abrasive belt is firstly contacted with the second protrusion portion 253b of the second connection pattern 253 when the module-cleaning process is performed. As a result, although the scratches are formed on the second protrusion portion 253b of the second connection pattern 253, the second flat portions 253a of the second connection pattern 253 are protected to maintain an electrical path the second electrode serials 250.

The touch screen panels according to the embodiments of this disclosure may be applied to display devices such as a liquid crystal display, a field emission display, a plasma display panel, an electroluminescence device, an electrophoresis display and a flexible display. In these cases, the substrates of the touch screen panels may be also used as substrates of the display devices.

The embodiments of this disclosure have been explained above with reference to the accompanying drawings. It will be evident to those skilled in the art that various modifications may be made thereto without departing from the broader spirit and scope of the embodiments. Further, although the embodiments have been described in the context its implementation in particular environments and for particular applications, those skilled in the art will recognize that the usefulness of the embodiments is not limited thereto and that the embodiments can be beneficially utilized in any number of environments and implementations. The foregoing description and drawings are, accordingly, to be regarded in an illustrative rather than a restrictive sense.

What is claimed is:

1. A touch screen panel, comprising:
a substrate;
an electrode forming part including a plurality of first electrode serials arranged in parallel in a first direction and a plurality of second electrode serials arranged in parallel in a second direction to cross over the plurality of first electrode serials;
a routing wire forming part formed on the substrate outside the electrode forming part, and including a plurality of first routing wires connected to the plurality of first electrode serials, respectively and a plurality of second routing wires connected to the plurality of second electrode serials, respectively;
a plurality of first insulation patterns formed at cross regions of the first and second electrode serials to insulate the first electrode serial from the second electrode serial; and
at least one buffer pattern positioned at at least one side of each of the first insulation patterns and spaced at a predetermined distance from the corresponding first insulation pattern, the at least one buffer pattern including a non-flat vertical protrusion and spaced apart from the first and second electrode serials,
wherein the first electrode serials include a plurality of first electrode patterns connected by a plurality of first connection patterns formed at the cross regions, and the second electrode serials include a plurality of second electrode patterns connected by a plurality of second connection patterns formed at the cross regions,
wherein the at least one buffer pattern is disposed between a portion of a corresponding second electrode pattern and the substrate, the portion of the corresponding second electrode pattern overlapping with the at least one buffer pattern, and
wherein a height of the portion of the corresponding second electrode pattern from the substrate is higher than a height of the corresponding second connection pattern at the cross region from the substrate or a height of another portion of the corresponding second electrode pattern that is between the at least one buffer pattern and the corresponding first insulation pattern.

2. The touch screen panel according to claim 1, wherein a height of the at least one buffer pattern is equal to or larger than a total height of a height of the first connection pattern added to a height of the first insulation pattern.

3. The touch screen panel according to claim 1, wherein a plurality of buffer patterns are positioned at both sides of each of the first insulation patterns.

4. The touch screen panel according to claim 1, wherein a width of a side wall of the at least one buffer pattern near to the first insulation pattern is equal to or smaller than a width of side wall of a buffer pattern far from the first insulation pattern.

5. A touch screen panel, comprising:
a substrate;
an electrode forming part including a plurality of first electrode serials arranged in parallel in a first direction and a plurality of second electrode serials arranged in parallel in a second direction to cross over the plurality of first electrode serials;
a routing wire forming part formed on the substrate outside the electrode forming part, and including a plurality of first routing wires connected to the plurality of first electrode serials, respectively and a plurality of second routing wires connected to the plurality of second electrode serials, respectively;
a plurality of first insulation patterns formed at each cross region of the first and second electrode serials to insulate the first electrode serial from the second electrode serial, wherein each of the plurality of first insulation patterns has at least one recess formed by at least one first flat portion and at least first and second protrusion portions protruded upward from both ends of the first flat portion; and
at least one buffer pattern disposed at at least one side of each of the first insulation patterns, the at least one buffer pattern including a non-flat vertical protrusion and spaced apart from the first and second electrode serials,
wherein the first electrode serials include a plurality of first electrode patterns connected by a plurality of first connection patterns formed at the cross regions, and the second electrode serials include a plurality of second electrode patterns connected by a plurality of second connection patterns formed at the cross regions,
wherein the at least one buffer pattern is disposed between a portion of a corresponding second electrode pattern and the substrate, the portion of the corresponding second electrode pattern overlapping with the at least one buffer pattern, and
wherein a height of the portion of the corresponding second electrode pattern from the substrate is higher than a height of the corresponding second connection pattern at the cross region from the substrate or a height of another portion of the corresponding second electrode pattern that is between the at least one buffer pattern and the corresponding first insulation pattern.

6. The touch screen panel according to claim 5, wherein the at least one first flat portion and the at least first and second protrusion portions are formed at areas where the first insulation patterns are overlapped with the second electrode serials.

7. The touch screen panel according to claim 6, wherein the second electrode serial includes at least one second flat portion corresponding to the at least one first flat portion and at least third and fourth protrusion portions corresponding to the at least first and second protrusion portions.

8. The touch screen panel according to claim 5, wherein a width of the first flat portion is larger than that of the first protrusion portion.

9. The touch screen panel according to claim 5, wherein the first flat portion and the first protrusion portion are alternately formed.

10. The touch screen panel according to claim 5, wherein the first flat portion and the first protrusion portion includes an overlap portion overlapped with the first connection pattern and a non-overlap portion which is not overlapped with the first connection pattern.

11. The touch screen panel according to claim 1, wherein a height of the at least one buffer pattern measured from the surface of the substrate is greater than a height of the corresponding first insulation pattern measured from the surface of the substrate.

12. The touch screen panel according to claim 5, wherein a height of the at least one buffer pattern measured from the surface of the substrate is greater than a height of the corresponding first insulation pattern measured from the surface of the substrate.

13. The touch screen panel according to claim 1,
wherein the at least one buffer pattern is disposed under and fully overlapped by one of the second electrode patterns.

14. The touch screen panel according to claim 1,
wherein a height of the at least one buffer pattern is equal to or larger than a total height of a height of the first connection pattern added to a height of the first insulation pattern, and
wherein the at least one buffer pattern and the first insulation pattern are disposed in a same plane that is parallel to the substrate.

15. The touch screen panel according to claim 5,
wherein the at least one buffer pattern is disposed under and fully overlapped by one of the second electrode patterns.

16. The touch screen panel according to claim 5,
wherein a height of the at least one buffer pattern is equal to or larger than a total height of a height of the first connection pattern added to a height of the first insulation pattern, and
wherein the at least one buffer pattern and the first insulation pattern are disposed in a same plane that is parallel to the substrate.

\* \* \* \* \*